United States Patent Office 3,759,792
Patented Sept. 18, 1973

3,759,792
METHOD OF MALTING
Eric Kneen, Elm Grove, Wis., assignor to Kurth Malting Corporation, Milwaukee, Wis.
No Drawing. Filed Sept. 21, 1970, Ser. No. 74,222
Int. Cl. C12c 1/04
U.S. Cl. 195—70                    13 Claims

ABSTRACT OF THE DISCLOSURE

In malting in which barley is steeped, germinated and dried by kilning, the improvement of adding a sulfite, bisulfite or metabisulfite salt or mixture thereof to the barley after steep-out and before significant kilning of the germinated grain, adding an acidic substance to the grain after at least one day of germination, and thereafter completing any remaining germination period and kilning period. The malt obtained is characterized by decreased wort pH, increased extract and wort soluble protein, and has a brighter color. The malt is equal to or better than that obtained by malt sulfuring according to conventional methods.

---

This invention relates to malt and processes of producing malt. More particularly, this invention is concerned with a novel malting process by which many, or all, of the benefits normally attendant on kiln sulfuring of malt are achieved without introducing sulfur dioxide into the kiln air stream either by burning sulfur or by introducing sulfur dioxide as such into the kiln air stream passing through the malt and with much better control than by such addition of sulfur oxides.

It is well known that cereal grains such as barley, rye, oats and wheat can be germinated, i.e., malted, to modify the kernel structure, composition and enzyme content. The resulting malts have many important uses in foods for animals and humans. Most important of all, however, is malted barley which is a basic material used in the brewing and distilling industries.

The production of malt from barely usually consists of four main steps.

The first step is to store the barley. Freshly harvested barley does not germinate well. About 30 to 60 days storage is sufficient to condition the barley for germination.

The second step is to "steep" the barley kernals in water, which may or may not be aerated. During steeping, respiration of the kernels becomes noticeable and heat and gases are given off, although no significant growth takes place. The barley kernels are steeped from two to three days in water at about 50–65° F. to ensure penetration of water into the barley and generally until a moisture content of approximately 35–45% is reached. When the steeping is completed, the white tips of the barley rootlets should not be more than just appearing ("chitting").

The third step is the germination of the barley kernels. Germination involves subjecting the steeped barley to appropriate conditions of temperature, moisture and oxygen supply for a time sufficient for the barley kernel (the endosperm mass) to be made porous and growth facilitated. Growth starts slowly at the embryo end of the kernel the first day with the growth being accelerated the second day. The barley kernel begins to "chit" at the base of the kernel by showing a white tip. Rootlets then grow outwardly away from the tip. The "acrospire" also starts from the base of the kernel and grows under the hull toward the top end of the kernel. When the acrospire has grown from three quarters to the full length of the kernel, the enzymatic system of the barley usually has been developed and conditioned so it will function as malt to convert (a) starches to dextrins and sugares and (b) insoluble proteins to soluble proteins during mashing operations in a brewery or distillery, and (c) provide a source of desirable taste and aroma, such as in beer.

In the fourth step, the germinated green malt is dried to reduce its moisture content and stop growth. This process, known as malt kilning, utilizes heated air passed directly through the malt as it rests on the perforated floor of a malt kiln. Customarily a period of from one to two days is utilized for kilning. In the first stages of kilning the air temperature is regulated at 120 to 130° F. to effect reduction of the malt moisture to between 5 and 10% without excesive enzyme destruction. In the production of distillers malt, where high enzyme activity is desired, complete drying at these relatively low temperatures may be adequate. However, in the production of brewers malt, where lower moisture in the range 3.5 to 4.5% is desired, along with a reduction of enzyme activity and the development of characteristic malt flavor, the dried malt may be subjected to final kilning temperatures in the range of 170 to 200° F. for several hours.

Customarily, the green malt is subjected to sulfur dioxide vapors in the early stages of kilning while it is still moist. The sulfur dioxide is introduced into the air stream passing through the malt either as the result of burning sulfur or by direct injection of sulfur dioxide itself.

Advantages attendant on the use of burning sulfur or using sulfur dioxide itself in the early stages of kiln drying are evidenced primarily in four measurable factors, well understood by malting laboratories:

(a) The surface of the malt becomes somewhat bleached. The degree of bleach commonly is measured by determining light reflectance from the finished malt surface and recording it in "Agtron" units—the higher the Agtron value the brighter the malt.

(b) An "extract" which results when ground malt is mashed with water to produce a wort. The standard conditions are as specified by the American Society of Brewing Chemists, Methods of Analysis (6th ed.), The Society: Glenview, Illinois (1958). The potential extract is determined on finely ground malt and reported as percent, dry basis. It represents the soluble material extractable from the malt to be utilized in, for example, brewing. In general, the higher the extract value the greater the utility of the malt for most uses.

c) Wort soluble protein is an important factor measured in the wort (see Methods of Analysis, above). This too is recorded as percent, dry basis. Not only does it contribute to the total extract but also represents an important factor in yeast nutrition, when the wort is used for brewing, and in flavor development when the wort is used for food purposes.

(d) The hydrogen ion concentration of the wort, as measured by the pH value, is considered an important factor in the brewing process, as see L. H. Bradee, Technical Quarterly, Master Brewers Assoc. of America, vol. 7, No. 1, pp. 37–42, 1970.

The pH of a malt wort when produced according to Methods of Analysis cited above varies from about 6.0 to about 5.7. When introduced into commercial brewing, the desirable commercial mash pH of less than 5.5 is more easily achieved by malt pH values in the lower, rather than the higher portion of, the range of 5.7–6.0. For example, two malts, one sulfured and one not, gave A.S.B.C. worts (Methods of Analysis ref. above) of 5.80 and 5.95 respectively. When these same two malts were used in a typical brewers mash of 60% malt and 40% corn, the wort pH values were 5.52 and 5.61 respectively. The pH value of 5.52 for the sulfured malt mash conforms with the value recommended as desirable by Bradee (loc. cit.).

The influence of kiln sulfuring on the four quality factors discussed above is illustrated in Table A where a typical Larker green malt was kilned with and without the fumes from burning sulfur:

TABLE A

|  | Brightness, Agtron | Extract, percent | Soluble protein, percent | Wort acidity, pH |
|---|---|---|---|---|
| Sulfured | 47 | 75.2 | 5.45 | 5.80 |
| Not sulfured | 35 | 74.5 | 4.85 | 5.95 |

It is noted that the sulfured malt has greater brightness, extract and soluble protein, and has a lower pH than the unsulfured control. In greater or lesser degree, depending on the kind of green malt being processed and on the quantity of sulfur burned and method of burning, these four factors always are observed to respond in a similar fashion to that shown in Table A.

Another Larker green malt, with larger kernel size and inherently greater extract, was processed by introducing progressively higher quantities of pure gaseous sulfur dioxide through the malt in the first stage of kilning. The results are given in Table B.

TABLE B

| Grams $SO_2$ per 900 grams green malt | Brightness, Agtron | Extract, percent | Soluble protein, percent | Wort acidity, pH |
|---|---|---|---|---|
| 0 | 22 | 76.0 | 4.76 | 5.90 |
| 0.76 | 25 | 76.5 | 5.09 | 5.88 |
| 1.52 | 28 | 77.3 | 5.48 | 5.82 |
| 2.28 | 37 | 77.9 | 5.73 | 5.70 |

The data shows that the use of sulphur dioxide has an effect similar to that of the sulfur oxides resultnig from the burning of sulfur.

The introduction of sulfur oxides into the kiln air stream usually accomplishes the objectives but is difficult to control. The process is inefficient; only about 10 to 20% of the sulfur oxides passed through the malt are absorbed by the malt. Further, the degree of absorbance is dependent on the manner in which the sulfur is burned, the rate of air flow through the malt, the humidity of the air being passed through the malt, the moisture content and temperature of the malt itself, its physical depth, its type, and its degree of modification. These variables all can lead to lack of uniformity in the finished product. Further, the bulk of the sulfur oxides are exhausted to the atmosphere where they represent undesirable pollutants. There thus clearly is a need for improvements in this part of the malting process.

According to the present invention, there is provided improvements in the malting process in which the beneficial effects that normally result from malt sulfuring are obtained to a substantial extent, and generally to the same or a higher extent, than realized by conventional malt sulfuring, with much better control.

As applied to the conventional process of malting in which a ceral grain such as barley is steeped, germinated and dried by kilning, the invention comprises the improvement of adding a sulfite, bisulfite or metabisulfite salt or mixture thereof to the grain after steep-out and before significant kilning of the germinated grain, adding an acidic substance to the grain after at least one day of germination, and thereafter completing any remaining germination period and kilning period. By treating the malt in this manner, a product is obtained characterized by decreased wort pH, increased extract and wort soluble protein and a brighter color. Furthermore, these indicia of increased quality and superior properties are all substantially higher than an untreated control malt, and generally at least two or more, and usually all, these values are equal to or better than those for a malt sulfured according to conventional methods and with much better process control and efficiency. It has also been found that the addition of the sulfite, bisulfite or metabisulfite without addition of an acidic substance does not give satisfactory benefits nor improve the malt nearly to the extent when both materials are used. Also, use of an acidic substance alone is not satisfactory since it does not lead to an increase in the values described above as important for a quality malt.

The acidic substance added to the grain is advisably one which, in the presence of moisture reacts with the sulfite, bisulfite or metabisulfite salt to form the sulfite ion to effect the beneficial changes sought to be achieved in the malt.

There are many acidic substances which can be used in practicing the invention. The material used, however, should leave no unacceptable residue in the malt. The most suitable acidic substances at present seem to be the mineral acids such as sulfuric acid, phosphoric acid, hydrochloric acid and nitric acid. Organic acids can also be used, such as citric acid, tartaric acid, malic acid, acetic acid, latic acid, monochloroacetic acid and trichloroacetic acid. Acid salts of organic and inorganic acids can also be used such as sodium acid sulfate, potassium acid sulfate, sodium dihydrogen phosphate and monosodium citrate. Mixtures of two or more acidic substances can also be employed.

The amount of acidic substance added to the malt is not narrowly critical. However, enough should be added to render the sulfite, bisulfite or metabisulfite salt added to the malt completely effective. Of course, an excessive amount of acidic substance which may defeat the purpose of the invention should not be used nor should so little be employed as to make the benefits inconsequential. This is also true regarding the sulfite, bisulfite or metabisulfite addition. Usually, from about 500 to 8000 parts of acidic substance, on a weight basis, per one million parts of grain on a dry weight basis is satisfactory, although higher and lower amounts of some acidic substances may be found to be more satisfactory. The acidic substance of choice presently appears to be sulfuric acid and its use in the range of 500 to 1500 parts per million usually gives satisfactory results.

The acidic substance can be applied to the malt in solid, particulate form or it can be sprayed on, advisably diluted with enough water to give a uniform complete application. An aqueous solution containing about 1 to 10% by weight of acidic substance is particularly suitable for making the addition.

Any inorganic or organic sulfite, bisulfite or metabisulfite salt can be used so long as it does not leave an unacceptable residue or give an unsuitable product for food and beverage purposes. The material presently considered most useful in practicing the invention are the sodium, potassium, calcium and magnesium sulfite, bisulfite and metabisulfite salts or mixtures of two or more of such salts. These and other materials can be used in any amount which leads to the objects of the invention. Neither too little should be employed to obtain the benefits of the invention in adequate amount nor too much which might defeat the purposes of the invention. Usually, from about 500 to 8000 parts of sulfite, bisulfite or metabisulfite, or a mixture of two or more such materials, per million parts of cereal grain on a dry basis gives satisfactory results. However, the optimum amount will vary from one material to another, but it is within the skill of the art to determine how much of any such material should be employed following the teachings herein. The most useful materials from experiments to date appear to be sodium sulfite, sodium bisulfite and sodium metabisulfite when used at about 500 to 2000 parts per million.

The sulfite, bisulfite or metabisulfite salt or mixture thereof can be added to the green malt in finely divided particulate form. It is advisable, however, to add the salt in aqueous dispersion using sufficient water to effect a uniform application. An aqueous solution containing about 1 to 10% by weight of the material is particularly useful.

The time of application of the acidic substance, and of the sulfite, bisulfie or metabisulfite salt, and their order of addition is important to achieve the benefits of the invention.

Generally, the acidic substance should not be added to the malt until at least after one day of germination. Addition prior to this time retards or stunts the growth of the germinating malt. For this reason, it is even advisable to defer the acid addition until at least after two days of germination. The optimum time of addition appears to be about after the third day of germination. However, the acidic substance can be added any time thereafter during the germination period and through to before significant kilning of the germinated grain. A very convenient time to add the acidic substance is during transfer of the green malt to the kiln. Of course, the acidic substance can be added to the malt during the early period of kilning so long as enough moisture is present for the acid to react with the sulfite, bisulfite or metabisulfite salt.

Addition of the sulfite, bisulfite or metabisulfite salt is advisably made after the grain has been steeped and before significant kilning of the germinated grain. The material may be added as the grain is transferred from the steep tank to the germination beds or drums, while the grain is being germinated, as the grain is transferred to the kiln, or while it is in the kiln.

While the acidic substance and the sulfite, bisulfite or metabisulfite salt can be added simultaneously, subject to the acidic substance not being added until after one day of germination, this is not advisable, since sulfur dioxide is released too quickly and too much is lost in aeration of the grain, with greatly decreased effectiveness. Accordingly, to obtain the maximum benefits of the invention the sulfite, bisulfite or metabisulfite salt should be added to the grain before the acid substance is added. Furthermore, the acidic substance should be added at least two hours, and advisably at least four hours, after the addition of the sulfite, bisulfite or metabisulfite salt to the grain. By following this order of addition, especially if all additions are made during the germination period, which is considered advisable, very little sulfur dioxide is lost into the atmosphere and the benefits obtained as measured by malt pH, extract, soluble protein and brightness are substantial and generally equal to or better than those obtained by conventional malt sulfuring. The addition of the acidic substance need not be made in a metter of hours after the sulfite is added, since it can be added even days thereafter with good results.

It is also within the scope of the invention to apply a solid acidic substance and a solid sulfite, bisulfite or metabisulfite in powder or particulate form, separately or in admixture, to the malt. This method appears to perform satisfactorily, especially when the addition is made when the germinated grain is in transfer to the kiln.

Practice of the invention also often leads to increased recoveries of malt, primarily by the action of the sulfite, bisulfite or metabisulfite restricting rootlet growth. In addition, malt produced according to the invention often gives a wort much lower, or free of, haze than malts otherwise produced. This is especially so in the malting of Larker barley which tends to give hazy worts normally but when malted according to the invention clear worts are obtained.

The introduction of the sodium or potassium salts of sulfite, bisulfite, or metabisulfite followed by acidification with an acid such as sulfuric acid may lead to excessive sulfite or sulfate ions in wort made from the malt, since these salts are water soluble. By treating the green malt with lime water, for example with a solution of calcium hydroxide, the sulfites and sulfates of calcium are formed. These salts have much lower solubilities than the sodium or potassium salts and they are self-limiting in their contribution of sulfite or sulfate ions to the wort. The levels of these ions present in the wort then become similar to those in worts customarily produced by brewers, who normally use calcium sulfate treated water for The following examples are presented to illustrate the invention.

EXAMPLE 1

A lot of commercially produced Dickson "B" green barley malt was taken before kilning, divided into smaller samples and treated. The samples were then pilot kilned. The treatments were none, 1,000 and 2,000 p.p.m. of sodium metabisulfite (in terms of the dry barley uused for the malt produuction), and a very light sulfuring from burning sulfur. The metabisulfite was dissolved in a minimal amount of water, sufficient to give surface coverage of the malt. The malt and solution were intimately co-mingled before subjection to the drying conditions of the kiln. Kilning was for 22 hours at 120° F. followed by 3 hours at 185° F. The results for the final kiln dried malts are given in Table 1.

TABLE 1

| Pre-kiln treatment | Brightness, Agtron | Extract, percent | Soluble protein, percent | Wort acidity, pH |
|---|---|---|---|---|
| None | 28 | 76.9 | 4.57 | 6.05 |
| Na₂S₂O₅, 1,000 p.p.m | 47 | 77.1 | 4.78 | 5.98 |
| Na₂S₂O₅, 2,000 p.p.m | 52 | 77.4 | 5.01 | 5.92 |
| Very light sulfuring | 45 | 76.7 | 4.07 | 6.00 |

It is apparent from Table 1 that the use of 1,000 p.p.m. of $Na_2S_2O_5$ was similar to a very light sulfuring with some degree of surface bleaching of the malt, minimal effect on extract, if any, a minor effect on soluble protein and essentially no effect on wort pH, primarily a surface rather than an internal effect. Experience indicates that normal heavier sulfuring of this product gives Agtron values in the 50–55 range, extract percentages in the 77.5 to 78.0 range, soluble protein percentages in the 5.3 to 5.5 range, and a pH drop to the 5.80 to 5.85 range. Doubling the amount of metabisulfite to 2,000 p.p.m. brought the brightness up to the normal sulfuring range. However, extract and soluble protein did not increase proportionally and lowering of wort pH was inadequate.

EXAMPLE 2

In a trial with commercially produced Larker "A" green malt, 1,000 and 1,500 p.p.m. of sodium metabisulfite was added in aqueous solution before kilning and compared with no treatment. Kilning was a given in Example 1. The results are given in Table 2.

TABLE 2

| Treatment | Brightness, Agtron | Extract, percent | Soluble protein, percent | Wort acidity, pH |
|---|---|---|---|---|
| None | 27 | 76.8 | 4.95 | 5.95 |
| Na₂S₂O₅, 1,000 p.p.m | 42 | 76.7 | 5.13 | 5.95 |
| Na₂S₂O₅, 1,500 p.p.m | 49 | 77.0 | 5.17 | 5.95 |

With this barley variety, the use of up to 1,500 p.p.m. of sodium metabisulfite gave a bleaching effect but minimal or no effects otherwise.

Similar experiments also were carried out with potassium metabisulfite with similar results.

EXAMPLE 3

Samples of Larker "B" commercial green malt were each treated with 1,000 p.p.m. of sodium metabisulfite in water solution at malting temperature of 65° F. for various periods of time before treating with 1,000 p.p.m. of sulfuric acid in solution. When acid treated immediately after the metabisulfite treatment, some 290 p.p.m. of sulfur dioxide was found in the atmosphere immediately above the treated malt. When the metabisulfite treated malt was held for 2 hours before acid treatment, the atmospheric sulfur dioxide level dropped to 20 p.p.m. Atmospheric level of sulfur dioxide dropped to 2 p.p.m. with a 3-hour holding period before acid treatment, and to less than 1 p.p.m. after a 4-hour holding period. Surprisingly, it was found that the malt effect could be achieved by adding the metabisulfite to the green malt a matter of days before the acid addition.

EXAMPLE 4

A lot of commercially steeped Larker "A" barley was obtained and separated into 500 gm. (dry basis) portions for five day pilot germination, treatment if any, and kilning. One portion received no treatment other than the customary watering during germination to maintain the germination moisture level at about 45%. Four samples received 1,000 p.p.m. of sulfuric acid just before kilning. Three of these four recived 1,000 p.p.m. of sodium metabisulfite treatment: one after 2 days germination (3 days before kilning); one after 4 days germination (1 day before kilning); and one after essentially 5 days germination (about two hours before acid treatment and subsequent kilning). There was a detectable evolution of sulfur dioxide from the sample where the metabisulfite and acid were added within two hours of each other, but none whatever from the samples where the bisulfite had been added one or more days before acid treatment. The analytical results for the final, kilned malts are given in Table 3. Kilning was for 22 hours at 120° F. followed by 4 hours at 185° F.

TABLE 3

| Treatment | Brightness, Agtron | Extract, percent | Soluble protein, percent | Wort acidity, pH | Wort haze (nephelos units) |
|---|---|---|---|---|---|
| None | 33 | 76.8 | 5.34 | 5.85 | 50 |
| Acid alone | 46 | 77.0 | 5.50 | 5.84 | 36 |
| Na₂S₂O₅ (before acid): | | | | | |
| 2 hrs | 50 | 77.9 | 5.91 | 5.73 | 26 |
| 1 day | 55 | 77.7 | 5.86 | 5.73 | 22 |
| 3 days | 49 | 77.6 | 6.00 | 5.72 | 14 |

It is seen from Table 3 that sulfuric acid alone gave an improvement in malt brightness and a minor increase in soluble protein, but essentially no significant increase in extract or in lowering of wort pH value. The combination of metabisulfite and acid, no matter how long the time interval between the two additions, gave results that would be expected if the malt had been heavily sulfured on the kiln—marked increases in brightness, extract, and soluble protein and marked lowering of wort pH. It should be noted that all of these malts were abnormally well modified—thus explaining the overall higher ranges of soluble protein and lower ranges of wort pH.

An additional malt factor is given in Table 3—wort haze as determined by nephelometry and recorded in "nephelos units." It is considered high desirable by the malting and brewing industry to obtain clear worts when malt is mashed. Larker malt is particularly susceptible to the production of wort haze. It is noted from Table 3 that wort haze was somewhat reduced by the acid treatment alone, but markedly reduced by the combined treatment with metabisulfite and acid. This was unexpected, since metabisulfite treatment alone showed no such effect. Further, it was surprising that the reduction of wort haze became more pronounced the earlier the metabisulfite was used in the germination phase.

EXAMPLE 5

Using the same commercially steeped Larker "A" barley as in Example 4, a number of pilot malts were prepared in which the metabisulfite and acid treatment times were varied substantially, including adding the acid before the metabisulfite, rather than after. The materials and amounts used were the same as in Example 4, namely, 1,000 p.p.m. each of the metabisulfite and acid. The results are given in Table 4 with one sample being the same as in Table 3 for comparison. Kilning was done on the same schedule as in Example 4.

TABLE 4

| Treatment after indicated days of germination | | Brightness, Agtron | Extract, percent | Soluble protein, percent | Wort acidity, pH | Rootlets, percent | Malt recovery, percent |
|---|---|---|---|---|---|---|---|
| Na₂S₂O₅ | H₂SO₄ | | | | | | |
| 2 days | 3 days | 49 | 77.4 | 6.04 | 5.72 | 3.60 | 89.7 |
| do | 4 days | 52 | 77.4 | 6.08 | 5.73 | 3.56 | 90.0 |
| do | 5 days | 49 | 77.6 | 6.00 | 5.72 | 3.60 | 90.2 |
| 3 days | 2 days | 45 | 77.4 | 5.90 | 5.80 | 4.21 | 89.3 |
| 4 days | do | 50 | 77.4 | 5.87 | 5.81 | 4.26 | 89.4 |
| 5 days | do | 51 | 77.5 | 5.72 | 5.79 | 4.36 | 89.4 |

From Table 4, and comparing it with Table 3, it will be noted that, at the level of 1,000 p.p.m. each of metabisulfite and sulfuric acid acid a variety of sequential additions can be made while still achieving a substantial improvement over untreated, unsulfured malt in the quality factors listed. However, in this table data also are given for the production of rootlets and for the recovery of malt from barley, dry basis. It then appears that there is a decided advantage to adding the metabisulfite before the acid rather than after. When this is done, not only does the malt show a substantially lower pH and higher soluble protein than when the acid is used before the metabisulfite treatment, but the rootlets are restricted. With the malts listed in Table 4 this resulted in an average of 0.6 pound more malt per 100 pounds of barley steeped than the normal recovery for this barley of about 89%.

This effect of metabisulfite on inhibiting the rootlet growth of green malt is not a hydrogen ion effect. When green malt after 2 days germination was treated with 1,000 p.p.m. of sodium metabisulfite, allowed to rest for 6 hours and then extracted with distilled water, the pH of the extract was 5.50. This compares with a pH of 4.18 for 2-day green malt treated with 1,000 p.p.m. of sulfuric acid and a pH of 5.68 for a water extract of untreated 2-day-old green malt.

It becomes obvious that the growth inhibition is not a hydrogen ion (pH) effect. The sulfuric acid treated green malt, with a pH much lower than that of metabisulfite treated malt was not noticeably inhibited in growth. The pH of the acid treated 2-day-old green malt (4.18) is in the range taught by U.S. 3,085,945 (below pH 5.0 and preferably in the range 2.5 to 4.0). However, U.S. 3,085,945 teaches that acidulation is to be before significant germination of the steeped grain begins. Obviously, in the present invention addition of acid or metalbisulfite at 2 days germination is after significant germination has commenced. This was visually obvious. Further, U.S. 3,085,945 teaches the combined use of acid and a growth promoting amount of gibberellic acid. In the present invention no growth promoting substance, such as gibberellic acid, need be employed.

The requirement for acid addition subsequent to the onset of significant germination in the present invention is substantiated by an experiment in which portions of a 1-day germinated green malt, with significant signs of germination, were treated with 1,000 p.p.m. of sulfuric acid and then treated later with 1,000 p.p.m. of sodium metabisulfite, separately, after 2, 3, 4 and 5 days germination. Average values found were 77.1% for extract, 5.46% for soluble protein, and malt recovery, over 90%. Obviously, this type of treatment was less effective than when the acid was added later (see Table 4) and even less effective than when the addition of sodium metabisulfite preceded the acid addition.

EXAMPLE 6

The principles outlined in Example 5 were applied using 1500 bushels (barley basis) of 5-day germinated green malt from Dickson "A" barley. The malt was treated with a sodium metabisulfite solution equivalent to 1,000 p.p.m. of metabisulfite (barley basis). Some 4 hours later it was sprinkled with 1,000 p.p.m. of sulfuric acid as it was transferred to the kiln. There was no measurable sulfur dioxide effluent as the malt was being acid treated and none from the kiln stack as heated air was driven through the melt in any stage of drying, early or late. In all instances the effluent, if any, contained less than 1 p.p.m. of sulfur dioxide. Kilning was on a commercial 36-hour schedule with initial kilning temperatures in the 120–130° F. range increasing progressively in the final stages to a terminal kilning at 170° F.

Analytical data for this malt, for a regularly sulfured control malt, and for an unsulured control malt are given in Table 5. No data are given for wort haze since the Dickson variety gives clear worts, whether treated or not.

TABLE 5

| Malt Treatment | Brightness, agtron | Extract, percent | Soluble protein, percent | Wort acidity, pH |
|---|---|---|---|---|
| None | 28 | 76.3 | 4.34 | 6.00 |
| Normal kiln sulfuring | 52 | 77.3 | 4.93 | 5.80 |
| Na₂S₂O₅ plus acid | 58 | 77.2 | 4.87 | 5.78 |

It is obvious from Table 5 that the metabisulfite-acid process accomplihed essentially the same improvement in the malt factors as did normal kiln sulfuring with a much more controllable process than the burning of sulfur, only partial absorption of the gases therefrom and contamination of the atmosphere with the bulk of such gases.

EXAMPLE 7

1,000 p.p.m. of sodium metabisulfite in aqueous solution was sprinkled on a 1500 bushel lot of Larker "B" malt in process of germination and 1,000 p.p.m. sulfuric acid added later in the process. The metabisulfite was added after two days of germination and the acid during the fourth day. The malt was transferred to the kiln after 5 days germination. Kilning was as given in Example 6. There was no measurable sulfur dioxide effluent either in the germination compartment or from the kiln. Further, it was noted that the rootlets of this treated malt were somewhat restricted substantiating the pilot observations of greater malt recovery from barley. Analytical data for this malt, for a normally sulfured commercial control and for an unsulfured commercial control are given in Table 6.

TABLE 6

| Malt treatment | Brightness, agtron | Extract, percent | Soluble Protein, percent | Wort acidity, pH | Wort haze (nephelos units) |
|---|---|---|---|---|---|
| None | 14 | 74.5 | 4.85 | 6.05 | 125 |
| Normal kiln sulfuring | 42 | 75.8 | 5.24 | 5.86 | 156 |
| Na₂S₂O₅ plus acid | 40 | 76.1 | 5.53 | 5.82 | 20 |

It is apparent from Table 6 that the malt improvement by the metabisulfite-acid process, without atmospheric pollution, is at least as pronounced as by the kiln sulfuring process with its substantial atmospheric contamination with sulfur dioxide. This sulfite-acid process has two distinct additional advantages over the normal kiln sulfuring procedure: economically, there is the potential for more malt recovery per bushel of barley steeped, and from a quality standpoint the typical "Larker haze" essentially is removed from the wort.

EXAMPLE 8

A lot of commercial Larker "A" green malt was obtained before kilning and processed in small lots with two levels of sodium metabisulfite and three levels of sulfuric acid, then kilned without sulfuring at 120° F. for 22 hours, followed by 185° F. for 4 hours. The results, compared with an untreated, unsulfured control are shown in Table 7.

TABLE 7

| Treatment (p.p.m.) Na₂S₂O₅ | H₂SO₄ | Brightness, Agtron | Extract, percent | Soluble protein, percent | Wort acidity, pH |
|---|---|---|---|---|---|
| None | None | 32 | 75.6 | 4.67 | 5.96 |
| 1,000 | 500 | 47 | 76.1 | 4.94 | 5.90 |
| 1,000 | 1,000 | 50 | 76.5 | 5.10 | 5.82 |
| 1,000 | 1,500 | 51 | 77.1 | 5.35 | 5.78 |
| 500 | 1,000 | 43 | 76.6 | 5.09 | 5.83 |
| 500 | 1,500 | 45 | 77.2 | 5.55 | 5.73 |

From the data of Table 7 it would appear that to give the optimum overall effect on the factors listed with this malt, 1,000 p.p.m. of metabisulfite and 1,500 p.p.m. of acid should be used.

EXAMPLE 9

A lot of commercial Larker "A" green malt was obtained in an early stage of its processing. This was divided into small lots and treated with various combinations of sodium metabisulfite and sulfuric acid. The metabisulfite was applied at the end of 4 days germination, with the acid applied after 3 days germination, i.e., just before kilning. The malts were then pilot kilned and compared with an untreated, unsulfured sample. Kilning was for 21 hours at 120° F. followed by 185° F. for 3 hours. The results are given in Table 8.

TABLE 8

| Treatment (p.p.m.) Na₂S₂O₅ | H₂SO₄ | Brightness, Agtron | Extract, percent | Soluble protein, percent | Wort acidity, pH |
|---|---|---|---|---|---|
| None | None | 37 | 77.5 | 5.32 | 5.91 |
| 1,000 | 500 | 49 | 77.8 | 5.45 | 5.87 |
| 1,000 | 1,000 | 56 | 78.5 | 5.67 | 5.82 |
| 1,000 | 1,500 | 57 | 78.7 | 5.95 | 5.79 |
| 500 | 1,000 | 57 | 77.8 | 5.62 | 5.82 |
| 750 | 1,000 | 54 | 78.2 | 5.74 | 5.83 |

EXAMPLE 10

A lot of commercial Larker "A" green malt was obtained and portions of it treated on a pilot scale with lactic acid and with phosphoric acid in combination with sodium metabisulfite before kilning. The metabisulfite treatment was 1,000 p.p.m. in each case and the acid level was 2,000 p.p.m. Comparison was with an untreated unsulfured malt control. Results for the finished pilot kilned malts are given in Table 9. Kilning was at 120° F. for 22 hours followed by 185° F. for 3 hours.

TABLE 9

| Acid treatment | Brightness, Agtron | Extract, percent | Soluble protein, percent | Wort acidity, pH |
|---|---|---|---|---|
| None | 23 | 75.4 | 4.62 | 5.90 |
| Phosphoric acid | 33 | 76.2 | 4.99 | 5.80 |
| Lactic acid | 35 | 76.1 | 4.98 | 5.76 |

It is apparent that both inorganic and organic acids can be used in combination with metabisulfite in the process as a substitute for kiln sulfuring. All four quality factors were improved.

With a different green malt another organic acid, citric acid, was used and, in addition, an acid salt, potassium bitartrate. The acid and acid salt were added at the 2,000 p.p.m. level after 5 days germination, i.e., just before kilning, following previous treatment after 4 days germination by sodium metabisulfite at the 1,000 p.p.m. level. Kilning was at 120° F. for 22 hours followed by 185° F. for 3 hours. The results are given in Table 10.

TABLE 10

| Acid treatment | Brightness, Agtron | Extract, percent | Soluble protein, percent | Wort acidity, pH |
|---|---|---|---|---|
| None | 30 | 74.6 | 4.47 | 5.98 |
| Citric acid | 55 | 74.8 | 4.80 | 5.81 |
| Potassium bitartrate | 50 | 74.7 | 4.57 | 5.91 |
| Kiln sulfured control | 49 | 74.7 | 4.61 | 5.88 |

With this particular malt neither the citric acid nor the acidic salt when combined with metabisulfite gave much increase in extract. However, as shown in Table 10, neither did kiln sulfuring. However, both the acid and the acidic salt did give surface bleaching of the malt, increase in wort soluble protein, and a drop in wort pH, approaching or bettering the effect given by normal kiln sulfuring.

EXAMPLE 11

A mixture of sodium metabisulfite powder and potassium bitartrate powder was applied dry to a green malt before kilning. There was very little sulfur dioxide effluent to atmosphere and as the moisture of the green malt induced reactions within the malt mass a substantial improvement in the malt factors measured was evident: the brightness was improved over the untreated control by 22 Agtron units, the extract by 0.7%, the soluble protein by 0.14%, and the wort pH reduced slightly.

EXAMPLE 12

Sodium metabisulfite in water solution has a sufficiently low pH, about 4.0, at the concentration employed, to represent a minor corrosion problem with exposed metal in commercial malting equipment. While sodium sulfite is not as corrosive at the relatively high pH of its water solution (about pH 8.0), it is corrosive when acidified. The same is true for the quite water insoluble calcium sulfite. It was thought that a sulfite, such as sodium sulfite, could be applied early in the malting process with no corrosive effect on, for example, the perforated metal floors of the germinating compartments or on the metal walls of germinating drums. The acid treatment could follow later by uniformly applying the acid to the sulfite treated malt as it was being conveyed to the kiln through and on equipment of low sensitivity to acid corrosion.

A lot of commercially steeped Larker "A" barley was divided into pilot portions and separated portions processed after 2 days and after 4 days of germination with a solution of sodium sulfite containing the sulfite at a level representing 1,000 p.p.m. in terms of the dry barley steeped. In each instance, the treated malt was continued in germination until a total germination time of 5 days had elapsed. Sufuric acid at the 1,000 p.p.m. level (in terms of the barley) was then applied and the malts kiln dried at 120° F. and terminally kilned at 185° F. without any further treatment. The results are given in Table 11. Factors typical of normal ranges for untreated, unsulfured malt of this type are given for comparison.

TABLE 11

| Treatment | Brightness, Agtron | Extract, percent | Soluble protein, percent | Wort acidity, pH |
|---|---|---|---|---|
| None | 28–37 | 76.8–77.5 | 4.8–5.3 | 5.9–6.0 |
| Na$_2$SO$_3$, 2 days germination | 50 | 77.8 | 5.51 | 5.81 |
| Na$_2$SO$_3$, 4 days germination | 49 | 78.1 | 5.75 | 5.82 |

The data shows, as with metabisulfite, that sulfite can be introduced into the malting process early in the germination phase followed by acid addition later and the desirable effects on malt composition achieved without kiln sulfuring.

The foregoing detailed description has been given for illustration purposes and it is not intended that the invention be limited to these embodiments.

I claim:

1. In the production of malt from a cereal grain by a process which employs the conventional steps of steeping, germination with substantial rootlet growth and kilning, with sulfuring of the malt by contacting it with a stream of gaseous sulfur oxides brought into contact with the malt during kilning and the venting of sulfur oxides in polluting amounts to the atmosphere, and in which process an acceptably modified malt is obtained without gibberellic acid as an additive, the improvement comprising replacing conventional sulfuring by:

adding a sulfite, bisulfite or metabisulfite salt or mixture thereof to the grain during about the last day of germination and before initiating significant kilning of the germinated grain;

adding an acidic substance to the grain during about the last day of germination and before initiating significant kilning, and after significant rootlet growth occurs, said acidic substance acting with the sulfite, bisulfite or metabisulfite salt, in improving the malt;

there being at least about a two hour period between application of the acidic substance, and the application of the sulfite, bisulfite or metabisulfite or mixture thereof, to the grain; and thereafter completing any remaining germination period and kilning period;

the amount of sulfur dioxide released from the grain and vented to the atmosphere in said process being below pollution levels;

said improved process providing an acceptably modified malt in the absence of gibberellic acid applied as an additive to the grain.

2. The process of claim 1 in which the sulfite, bisulfite or metabisulfite salt or mixture thereof is added to the grain prior to the addition of the acidic substance.

3. The process of claim 2 in which the acidic substance is added to the grain at least about four hours after the addition of the sulfite, bisulfite or metabisulfite salt or mixture thereof.

4. The process of claim 1 in which a sodium, potassium, calcium or magnesium sulfite, bisulfite or metabisulfite or mixture thereof is used and the acidic substance is a mineral acid.

5. The process of claim 1 in which the additions to the grain are completed before initiating kilning.

6. In the production of malt from a cereal grain by a process which employs the conventional steps of steeping, germination with substantial rootlet growth and kilning, with sulfuring of the malt by contacting it with a stream of gaseous sulfur oxides brought into contact with the malt during kilning and the venting of sulfur oxides in polluting amounts to the atmosphere, and in which process gibberellic acid is not required to obtain an acceptably modified malt, the improvement comprising replacing conventional sulfuring by:

adding a sulfite, bisulfite or metabisulfite salt or mixture thereof to the grain during about the last day of germination and before initiating significant kilning of the germinated grain;

adding an acidic substance to theg rain during about the last day of germination and before initiating significant kilning, and after significant rootlet growth occurs, said acidic substance acting with the sulfite, bisulfite or metabisulfite salt, in improving the malt; and thereafter completing any remaining germination period and kilning period;

the amount of sulfur dioxide released from the grain and vented to the atmosphere in said process being below pollution levels.

7. In the production of malt from a cereal grain by a process which employs the conventional steps of steeping, germination with substantial rootlet growth and kilning, with sulfuring of the malt by contacting it with a stream of gaseous sulfur oxides brought into contact with the malt during kilning and venting of sulfur oxides in polluting amounts to the atmosphere, and in which process gibberellic acid is not required to obtain an acceptably modified malt, the improvement comprising replacing conventional sulfuring by:

adding a sulfite, bisulfite or metabisulfite salt of mixture thereof to the grain during about the last day of germination and before initiating significant kilning of the germinated grain;

adding an acidic substance to the grain during about the last day of germination and before initiating significant kilning, and after significant rootlet growth occurs, said acidic substance acting with the sulfite, bisulfite or metabisulfite salt, in improving the malt;

there being a time interval between application of the acidic substance, and the application of the sulfite, bisulfite or metabisulfite or mixture thereof, to the grain; and thereafter completing any remaining germination period and kilning period;

the amount of sulfur dioxide released from the grain and vented to the atmosphere in said process being below pollution levels.

8. In the production of malt from a cereal grain by a process which employs the conventional steps of steeping, germination with substantial rootlet growth and kilning, with sulfuring of the malt by contacting it with a stream of gaseous sulfur oxides brought into contact with the malt during kilning and the venting of sulfur oxides in polluting amounts to the atmosphere, and in which process gibberellic acid is not required to obtain an acceptably modified malt, the improvement comprising replacing conventional sulfuring by:

adding a sulfite, bisulfite or metabisulfite salt or mixture thereof to the grain following at least about two days of germination and before initiating significant kilning of the germinated grain;

adding an acidic substance to the grain following at least about two days of germination and before initiating significant kilning, and after significant rootlet growth occurs, said acidic substance acting with the sulfite, bisulfite or metabisulfite salt, in improving the malt; and thereafter completing any remaining germination period and kilning period;

the amount of sulfur dioxide released from the grain and vented to the atmosphere in said process being below pollution levels.

9. The process of claim 8 in which there is a time interval between appliction of the acidic substance, and the application of the sulfite, bisulfite or metabisulfite or mixture thereof, to the grain.

10. The process of claim 9 in which the time interval is at least about a two hour period.

11. The process of claim 10 in which the acidic substance is added to the grain after the addition of the sulfite, bisulfite or metabisulfite salt or mixture thereof.

12. In the production of malt from a cereal grain by a process which employs the conventional steps of steeping, germination with substantial rootlet growth and kilning, with sulfuring of the malt by contacting it with a stream of gaseous sulfur oxides brought into contact with the malt during kilning and the venting of sulfur oxides in polluting amounts to the atmosphere, and in which process gibberellic acid is not required to obtain an acceptably modified malt, the improvement comprising replacing conventional sulfuring by:

adding a sulfite, bisulfite or metabisulfite salt or mixture thereof to the grain following at least about two days of germination and before initiatting significant kilning of the germinated grain;

adding an acidic substance to the grain during about the last day of germination and before initiating significant kilning, and after significant rootlet growth occurs, said acidic substance acting with the sulfite, bisulfite or metabisulfite salt, in improving the malt;

there being a time interval between application of the acidic substance, and the application of the sulfite, bisulfite or metabisulfite or mixture thereof, to the grain; and thereafter completing any remaining germination period and kilning period;

the amount of sulfur dioxide released from the grain and vented to the atmosphere in said process being below pollution levels.

13. In the production of malt from a cereal grain by a process which employs the conventional steps of steeping, germination with a substantial rootlet growth and kilning, and in which process gibberellic acid is not required to obtain an acceptably modified malt, the improvement comprising eliminating conventional sulfuring of the malt with a stream of gaseous sulfur dioxides brought into contact with the malt during kilning by:

adding a sulfite, bisulfite or metabisulfite salt or mixture thereof to the grain during about the last day of germination and before initiating significant kilning of the germinated grain;

adding an acidic substance to the grain during about the last day of germintaion and before initiating significant kilning, and after significant rootlet growth occurs, said acidic substance acting with the sulfite, bisulfite or metabisulfite salt, in improving the malt; and thereafter completing any remaining germination period and kilning period.

References Cited

UNITED STATES PATENTS

| 3,149,053 | 9/1964 | Kneen et al. | 195—70 |
| 3,085,945 | 4/1963 | Luchsinger et al. | 195—70 |
| 2,698,275 | 12/1954 | Stoller | 195—71 |

OTHER REFERENCES

Spillane, et al., The Use of Acetic Acid and Sulphur Dioxide to Limit Malting Losses, J. Inst. Brem., vol. 72, 1966 (pp. 398–403).

DAVID M. NAFF, Primary Examiner

U.S. Cl. X.R.

99—50, 52

PO-1050
(5/69)

UNITED STATES PATENT OFFICE
CERTIFICATE OF CORRECTION

Patent No. 3,759,792                          Dated September 18, 1973

Inventor(s) Eric Kneen

It is certified that error appears in the above-identified patent and that said Letters Patent are hereby corrected as shown below:

Col. 1, line 41, "barely" should be --barley--;
Col. 1, line 47, "kernals" should be --kernels--;
Col. 2, line 1, "sugares" should be --sugars--;
Col. 2, line 13, "excesive" should be --excessive--;
Col. 3, line 34, "resultnig" should be --resulting--;
Col. 3, line 58, "ceral" should be --cereal--;
Col. 4, line 19, "latic" should be --lactic--;
Col. 5, line 2, "bisulfie" should be --bisulfite--;
Col. 5, line 35, "acid" should be ''acidic--;
Col. 5, line 46, "metter" should be --matter--;
Col. 5, line 75, after "for" add --mashing.--.
Col. 6, line 8, "uused" should be --used--;
Col. 6, line 9, "produuction" should be --production--;
Col. 6, line 24, "4.07" should be --4.70--;
Col. 6, line 45, "was a" should be --was as--;
Col. 7, line 25, "recived" should be --received--;
Col. 7, line 41, "units" should be --units--;
Col. 7, line 62, "high" should be --highly--;
Col. 8, line 25, delete second "acid";
Col. 9, line 11, "melt" should be --malt--;
Col. 9, line 19, "unsulured" should be --unsulfured--;
Col. 9, line 31, "accomplihed" should be --accomplished--;
Col. 10, line 24, "3" should be --5--;
Col. 10, line 71, "acid" should be --Acidic--;
Col. 11, line 43, "sufuric" should be --Sulfuric--;
Col. 12, line 48, "theg rain" should be --the grain--;
Col. 12, line 69, "of" should be --or--;
Col. 13, line 38, "appliction" should be --application--;
Col. 14, line 3, "initiatting" should be --initiating--;
Col. 14, line 21, "with a" should be --with--;
Col. 14, line 25, "dioxides" should be --oxides--;
Col. 14, line 32, "germintaion" should be --germination--;
Col. 14, line 49, "Brem" should be --Brew--.

Signed and sealed this 26th day of February 1974.

(SEAL)
Attest:

EDWARD M. FLETCHER, JR.               C. MARSHALL DANN
Attesting Officer                      Commissioner of Patents